United States Patent
Sohn et al.

[11] 3,824,663
[45] July 23, 1974

[54] METHOD OF WELDING A TUBE TO A TUBE SHEET

[75] Inventors: Jesse Sohn, Newton, N.J.; Louis A. Gunther, Maspeth, N.Y.

[73] Assignee: Curtiss-Wright Corporation, Wood-Ridge, N.J.

[22] Filed: Feb. 7, 1973

[21] Appl. No.: 330,312

[52] U.S. Cl................ 29/157.4, 29/470.3, 29/481, 228/2
[51] Int. Cl............................................ B23p 15/26
[58] Field of Search............... 29/470.3, 157.4, 481; 228/2; 156/73

[56] References Cited
UNITED STATES PATENTS

| | | | |
|---|---|---|---|
| 1,255,469 | 2/1918 | Schlieder | 29/481 X |
| 2,710,443 | 6/1955 | Webb | 29/481 X |
| 2,795,039 | 6/1957 | Hutchins | 29/470.3 |
| 3,144,710 | 8/1964 | Hollander et al. | 29/470.3 |
| 3,238,612 | 3/1966 | Herman | 228/2 |
| 3,438,561 | 4/1969 | Calton | 228/2 X |
| 3,731,775 | 5/1973 | Brown et al. | 29/470.3 |

*Primary Examiner*—J. Spencer Overholser
*Assistant Examiner*—Robert J. Craig
*Attorney, Agent, or Firm*—Arthur Frederick

[57] ABSTRACT

The method welding of tubes to a tube sheet comprises butt welding an elongated bar to one end of a tube to be welded so that the bar is in substantial axial alignment with the tube and, thereafter, welding the opposite end of the tube to a tube sheet by friction or inertia welding using the bar to at least partially support the tube for movement relative to the tube sheet. After the tube is welded to the tube sheet, the bar is cut a predetermined distance from the point of attachment of the bar to the tube to form a cap, if desired. The bar then may be worked to provide the cap with a desired configuration.

8 Claims, 5 Drawing Figures

METHOD OF WELDING A TUBE TO A TUBE SHEET

This invention relates in general to friction and inertia welding, and more particularly, relates to a method of securing tubes to a tube sheet or plate by the friction or inertia welding technique.

BACKGROUND OF THE INVENTION

Heretofore methods of butt welding tubes to tube plates or sheets, such as tubes to a bundle plate of a heaterwell for a pressurized vessel, have been very costly and have required employment of highly skilled welders.

It is therefore an object of this invention to provide a method of welding tubes to tube sheet which method is relatively inexpensive and does not require highly skilled welders.

Another object of the present invention is to provide a method of welding a plurality of tubes to a tube sheet rapidly and easily.

A further object of this invention is providing a quick and inexpensive method of butt welding tubes to tube sheets and the capping of the distal ends of the tubes.

SUMMARY OF THE INVENTION

The present invention, therefore, contemplates a novel method of butt welding a plurality of tubes to a tube sheet or plate which comprises a first step of butt welding a solid elongated bar to one end of each tube to be welded so that the longitudinal axis of the bar is coextensive with the longitudinal axis of the tube to be welded. This welding step is preferably achieved by friction or inertia welding, such as disclosed in the U.S. Pats. to Holloway et al. No. 3,185,368, Calton et al., No. 3,568,299 and Loyd, No. 3,694,896, and by utilizing a suitable welding apparatus, such as the Inertia Welder, Model 250, manufactured by Caterpillar Tractor Company of Peoria, Ill. Thereafter, the flash formed at the point of weld on the inner surface of the tube is removed and, if desired, the inner portion of the solid bar adjacent the point of weld is shaped to a predetermined configuration. Next, the welded tube and bar assembly is butt welded to a tube sheet in axial alignment with a hole in the tube sheet. A boss may be provided around the periphery of the hole and the tube welded to the boss. The welding of the tube to the tube sheet is preferably accomplished by the friction or inertia welding technique and by employing a suitable welding apparatus, such as the Inertia Welder, Model 250, mentioned above, which is modified for indexing the tube and bar assembly or the tube sheet relative to the other. The bar of the tube and bar assembly serves as a support element and may be secured in a chuck or rotary headstock of a suitable welding apparatus, such as the aforesaid Inertia Welder. After the welding of the tube to the tube sheet is completed, the tube may be severed from the bar by cutting the tube to provide the desired length of tube from the tube sheet or, if capping of the end of the tube is desired, the bar may be cut a distance from the tube to provide the desired size cap. Thereafter, if desired, the peripheral surface of the cap may be worked to form such surface to a desired configuration.

The present invention also contemplates securing a plurality of tubes to a circular tube sheet having holes arranged in spaced parallel rows by first welding a tube at the hole adjacent the periphery of the tube sheet and in the row of holes at or next adjacent the diametral line of the tube sheet. Thereafter, the tubes are welded to successive holes in the aforesaid row and to holes in successive rows starting with the hole nearest the periphery of the tube sheet. After all of the tubes have been welded to the tube sheet at the holes in the substantially semi-circular area of the tube sheet, tubes are welded at the rows of holes in the remaining area of the tube sheet in the same sequence of steps as herein set forth.

BRIEF DESCRIPTION OF THE DRAWINGS

The above and other objectives and advantages of this invention will be apparent hereinafter from a consideration of the detailed description which follows when taken together with the accompanying drawings wherein one embodiment of the invention is illustrated, and in which.

DESCRIPTION OF PREFERRED EMBODIMENT OF THE INVENTION

Figure 1:
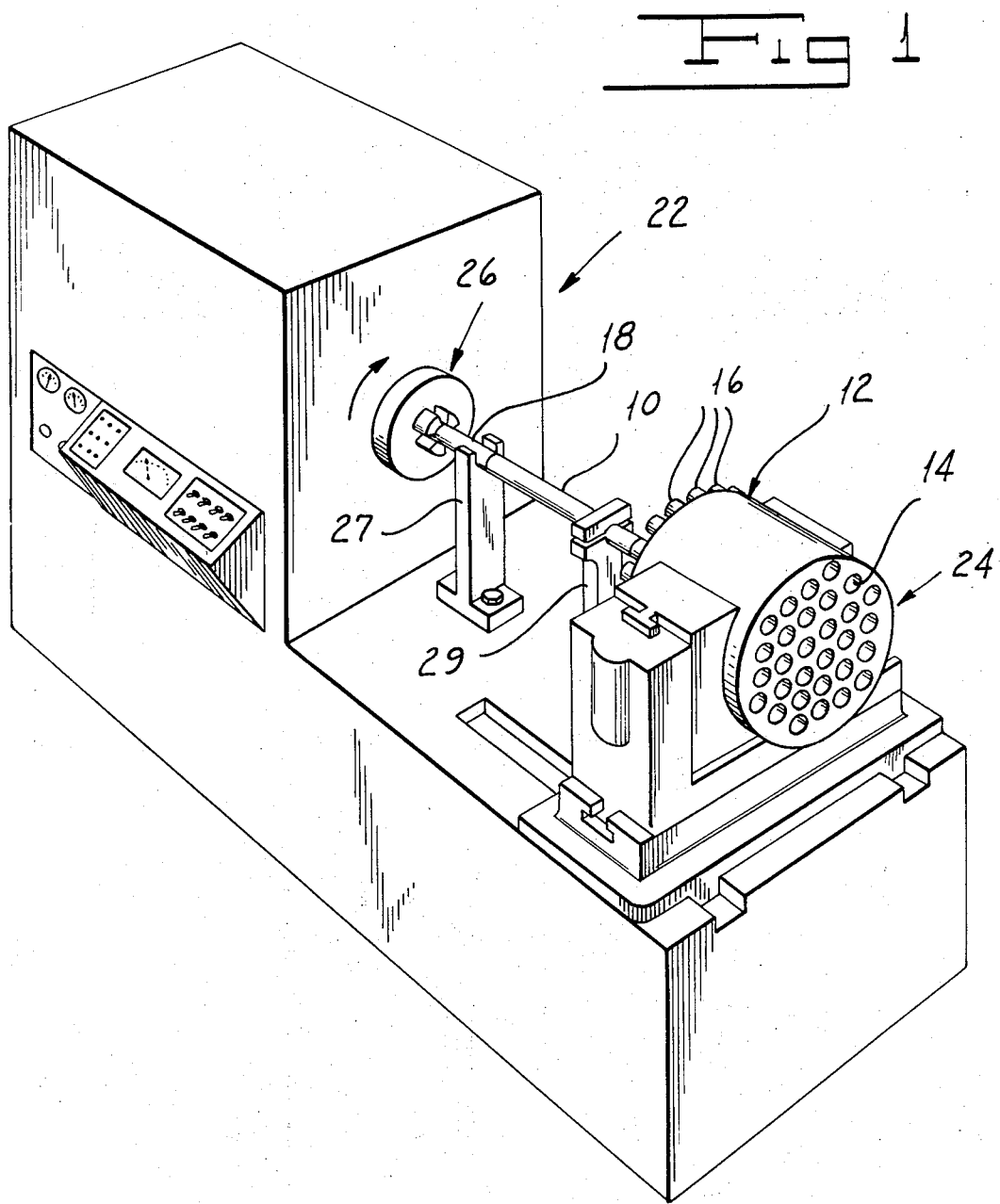
FIG. 1 is a schematic illustration of an apparatus which may be employed in carrying out the welding method according to this invention.
Figure 2:
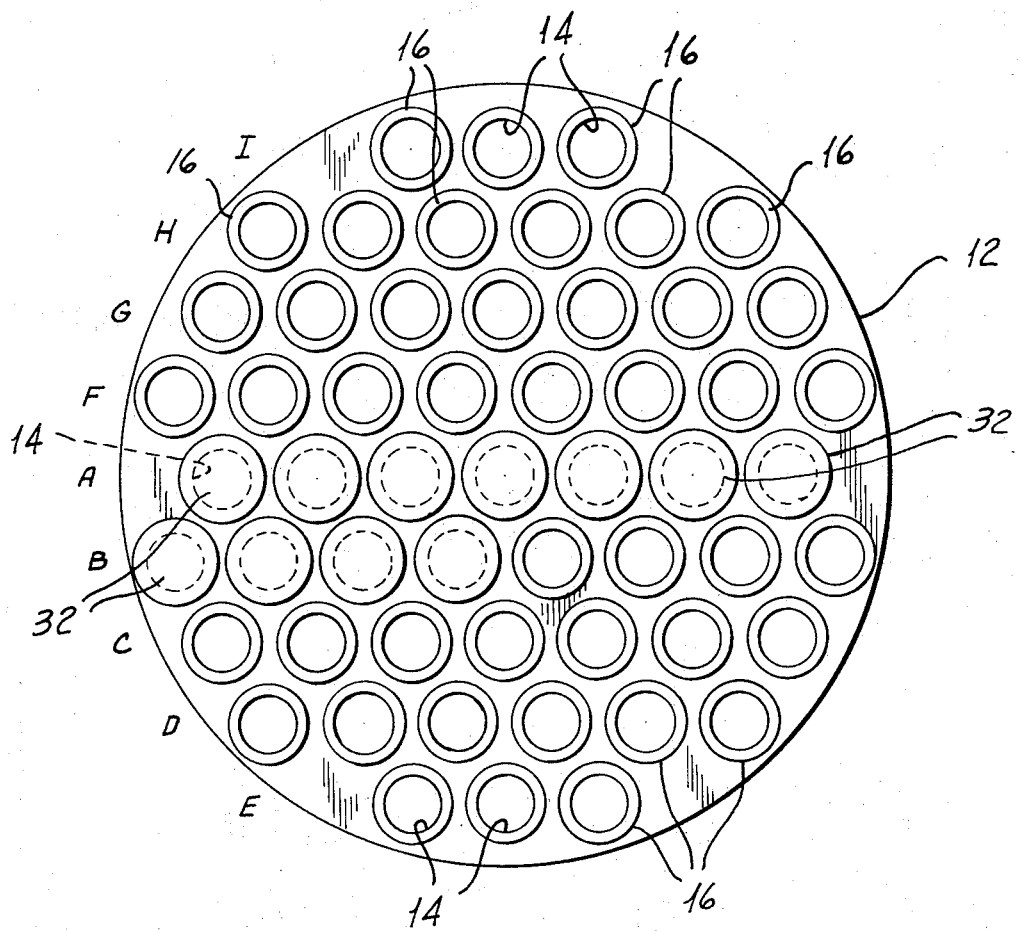
FIG. 2 is an end elevational view of a tube sheet or plate to which some tubes have been friction welded by the apparatus shown in FIG. 1 and in the sequence according to the present invention.

Now referring to the drawings and, more specifically, FIGS. 1 and 2, the reference number 10, refers to each tube of a plurality of tubes to be welded to a plate or tube sheet 12 by employing the well known friction or inertia welding technique which is disclosed in the previously identified U.S. patents to Holloway et al., Calton et al. and Loyd. The tube sheet 12 may be provided with a plurality of spaced openings or holes 14 extending through the tube sheet and arranged in spaced parallel rows (see FIG. 2). The tube sheet surface to which tubes 10 are to be welded is preferably formed so as to provide a boss 16 surrounding each hole 14. The bosses 16 are sized so that at the interface between each boss and the tube to be welded thereto each boss and its associated tube will readily become plastic and weld together under the heat of friction. To effect the inertia or friction welding of each tube to the tube sheet by the method according to this invention, any suitable inertia or friction welding apparatus may be employed such as shown in the aforesaid U.S. patents and such as the Model 250 Inertia Welder manufactured by Caterpillar Tractor Company of Peoria, Ill.

Figure 3:
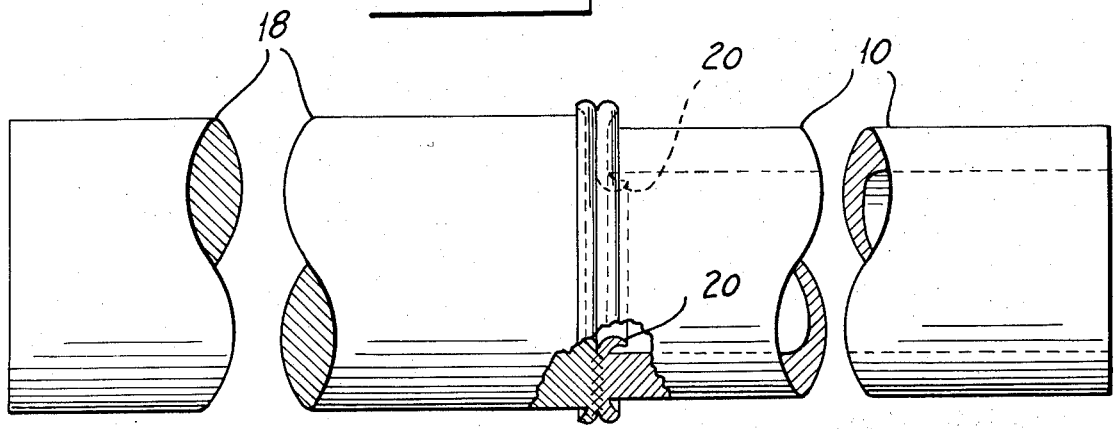
FIGS. 3, 4 and 5 show the stages according to this invention by which a capped tube is fabricated on a sheet or plate.
Figure 4:
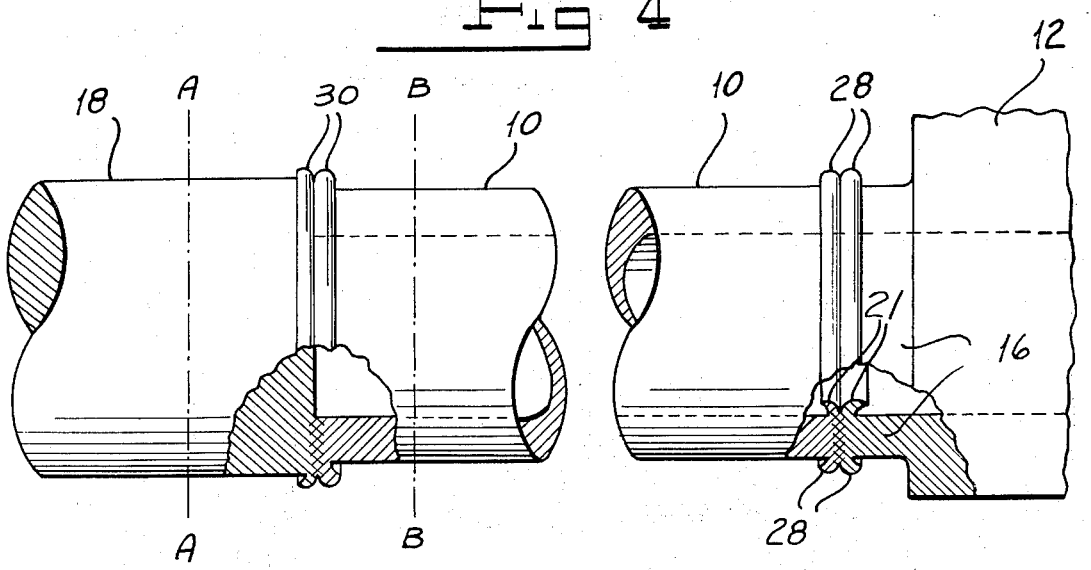
Figure 5:
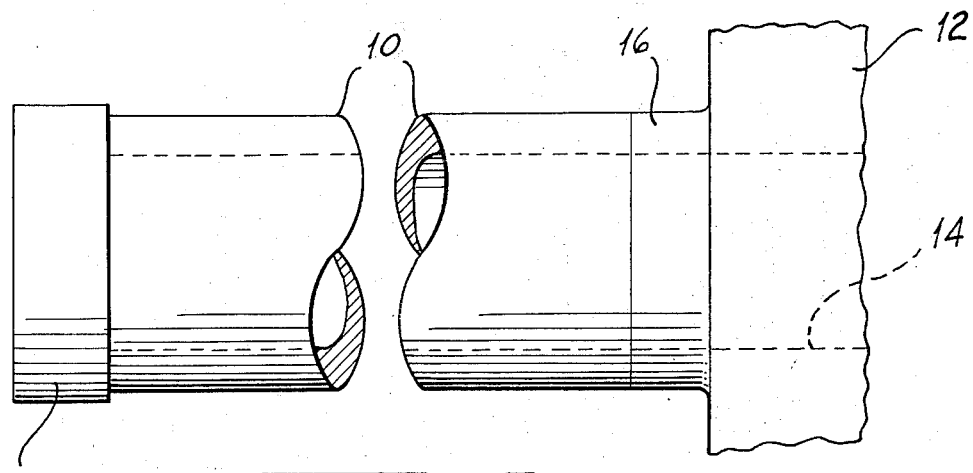

As best shown in FIGS. 3, 4 and 5 the welding method according to the present invention comprises first butt welding an elongated solid bar 18 to one end of each of the tubes 10 so that the longitudinal axes of the bar and tube are in substantial alignment. While this weld may be accomplished by any suitable welding technique, it is preferred that the weld be made by conventional friction or inertia welding techniques. After the weld is completed and if such weld is made by friction or inertia welding methods, the flash 20 on the inner diameter of tube 10 may be removed by boring, reaming or other suitable method. Also, if tube 10 is to be capped, the inner portion of bar 18 adjacent the weld may be machined to a desired configuration.

As shown in FIG. 1, tube 10 with the bar 18 attached thereto is now mounted in an apparatus for connecting tube 10 to tube sheet 12 by employment of inertia or friction welding techniques. To this end, a suitable apparatus 22, such as Model 250 Inertia Welder manufactured by Caterpillar Tractor Company of Peoria, Ill., which is modified to provide a workholder or tailstock 24 that is capable of adjustment in horizontal and vertical planes, may be employed. As schematically shown in FIG. 1, tube sheet 12 is secured in tailstock 24 while tube 10 with attached bar 18 is secured in the rotatable chuck or headstock 26 of apparatus 22. The bar 18 is clamped in headstock 26 so as to support tube 10 for movement relative to tube sheet 12. Additional support of the bar and tube assembly may be provided, if necessary, by support saddles 27 and 29. The tailstock 24 is adjusted to position tube sheet 12 so that the boss 16 to which the tube is to be welded is in substantial axial alignment with tube 10 and in endwise abutment against the distal end of boss 16. Thereafter, apparatus 22 is operated in a conventional manner to rotate and axially move tube 10 relative to tube sheet 12 to generate the requisite heat of friction and thereby plasticize the interfacial portions of tube 10 and boss 16 and, hence, inertia weld tube 10 to boss 16 as illustrated in FIG. 4. Thereafter, the outer peripheral weld beads or flashes 28 and 30 at the respective weldments of the tube to boss 16 and to bar 18 are removed by any suitable method, such as machining or grinding. If the inner flash 20 has not been removed, flash 20 and the other inner flash 21 (see FIG. 4) may be removed by a suitable means operating through hole 14 in tube sheet 12. Each of the tubes 10 of the plurality of tubes to be secured to tube sheet 12 are successively welded to the tube sheet in the same manner as herein described and preferably in the hereinafter set forth sequence according to another aspect of this invention.

As best shown in FIG. 2, the sequence of welding tubes 10 to tube sheet 12, having the plurality of holes 14 and associated bosses 16 arranged in spaced parallel rows, requires that a tube 10 be first welded to boss 16 located next adjacent the periphery of tube sheet 12 and in the row A of holes at or nearest to the diametrical line of tube sheet 12. Thereafter, tubes 10 are welded to successive bosses 16 in row A by indexing tailstock 24 horizontally relative to headstock 26 and a tube secured in the latter. After all of the tubes 10 are welded to bosses 16 in row A, tailstock 24 is indexed upwardly and horizontally relative to headstock 26 to position the hole 14 and its associated bosses 16 located in the next adjacent row B at the periphery of tube sheet 12 in proper alignment with a tube 10 to be welded. Thereafter, all of the tubes 10 are successively welded to be successive bosses 16 in row B in the same manner as described with respect to row A. The tailstock 24 and tube sheet 12 secured therein is again adjusted relative to headstock 26 to permit successive welding of tubes 10 to bosses 16 in rows C, D and E of tube sheet 12 in the same manner as tubes 10 were welded to the bosses in rows A and B. After all tubes 10 are welded to bosses 16 in rows A through E, tube sheet or plate 12 is removed from tailstock 24, inverted and replaced in the tailstock. The tubes 10 are then welded to the bosses 16 in rows F through J in the same manner as described with respect to rows A through E in the other half of the tube sheet.

After all the tubes 10 have been welded to tube sheet 12 or after each tube 10 has been welded to the tube sheet 12, bar 18 is severed from its associated tube 10 by cutting. If tube 10 is to be sealed by a cap 32 as shown in FIG. 5, bar 18 is cut along a plane A—A (see FIG. 4) a predetermined distance from the point of weld of the bar to the tube. Thereafter, if desired, the surface of cap 32 may be machined to provide the cap with a predetermined external configuration. In the event, a tube or tubes 10 are to be open and, therefore, not capped, bar 18 can be severed from its associated tube by cutting the tube along a plane B—B (see FIG. 4).

It is believed now readily apparent that the present invention provides a method of butt welding tubes to tube sheets quickly and inexpensively. It is a welding method by which a plurality of capped tubes may be secured to a tube sheet easily and cheaply and without the need for highly skilled welders.

Although two embodiments of the invention have been illustrated and described in detail, it is to be expressly understood that the invention is not limited thereto. Various changes can be made in the arrangement of parts without departing from the scope and spirit of the invention as the same will be understood by those skilled in the art.

What is claimed is:

1. The method of butt welding at least one capped tube to a tube sheet comprising the steps of
    a. welding one end of an elongated bar to one end of a tube to be welded to the tube sheet so that the longitudinal axis of the bar is in substantial alignment with the longitudinal axis of the tube;
    b. supporting the tube by said bar in abutment at one end against the tube sheet, rotating said bar and tube relative to and in contact with the tube sheet to generate frictional heat thereby welding the tube to said tube sheet; and
    c. cutting said bar in a plane spaced from the weld between the tube and said bar to provide a cap for a predetermined size on the distal end of said tube.

2. The method of claim 1 wherein after welding of the elongated bar to the tube, the flash along the inner surface of the tube at the point of weld is removed.

3. The method of claim 2 wherein the bar adjacent the inner surface of the tube is machined to a desired shape.

4. The method of claim 2 including the step removing the flash along the outer surface of the tube at the point of weld of the bar to the tube.

5. The method of butt welding a plurality of tubes to a tube sheet having a plurality of spaced holes arranged in parallel rows and having a boss surrounding each hole, said method comprising the steps of
    a. welding one end of an elongated bar to one end of each of the tubes to be welded to the tube sheet so that the longitudinal axis of the bar is in substantial alignment with the axis of said tube;
    b. supporting each of the tubes to be welded by said bar associated therewith in abutment at one end against a boss to which the tube is to be welded and for movement relative to the boss to generate heat of friction and thereby the welding of the tube to the boss;

c. the sequence of welding said tubes to said bosses comprises
　c-1. welding a tube to the boss adjacent the periphery of the tube sheet and in the first row on or nearest the diametrical line of the tube sheet;
　c-2. welding other tubes to successive bosses in said first row;
　c-3. welding tubes to successive bosses in each row of bosses next adjacent one side of said first row starting in each adjacent row with the boss adjacent the periphery of the tube sheet;
　c-4. rotating the tube sheet and welding tubes to successive bosses in each row of bosses adjacent the opposite side of said first row starting in each adjacent row with the boss adjacent the periphery of the tube sheet.

6. The method of claim 5 including the stem of removing at least a portion of each of said bars.

7. The method of claim 5 including the step of removing a portion of each of said bars at a point spaced from the weldment of the bar to the associated tube to form a cap for each tube.

8. The method of claim 5 including the step of removing the inner and outer flashes from the weldment of each of the tubes to the tube sheets.

* * * * *